United States Patent Office 3,366,693
Patented Jan. 30, 1968

3,366,693
PREPARATION OF MERCAPTANS AND SULFIDES
David I. Randall, New Vernon, N.J., and Harlan B. Freyermuth, Easton, Pa., assignors to General Aniline & Film Corporation, New York, N.Y., a corporation of Delaware
No Drawing. Filed Sept. 16, 1964, Ser. No. 397,030
13 Claims. (Cl. 260—609)

ABSTRACT OF THE DISCLOSURE

An epoxide containing at least three carbon atoms, such as epichlorhydrin is reacted, in the presence of a catalytic amount of 2,2'-thiodiethanol, with hydrogen sulfide to produce a mercaptan or corresponding sulfide.

---

The present invention relates, in general, to the preparation of organic compounds and, in particular, to the preparation of 2-hydroxyethyl mercaptans and 2,2'-dihydroxyalkyl sulfides by the reaction of epoxides containing at least three carbon atoms and hydrogen sulfide in the presence of 2,2'-thiodiethanol.

Heretofore, according to customary practices, mercaptans have been prepared by the interaction of an alkyl halide and the monopotassium salt of hydrogen sulfide in alcoholic solution. The reaction is analogous to the preparation of an alcohol by the hydrolysis of an alkyl halide and thus constitutes an indirect method of replacing a hydroxyl group with a sulfhydryl group since an alkyl halide is prepared from an alcohol. A direct method of preparing mercaptans consists in passing vapors of an alcohol mixed with hydrogen sulfide over certain catalysts at elevated temperatures. The alkyl sulfides, on the other hand, usually are prepared by the reaction of the alkali salt of a mercaptan and an alkyl iodide or by the reaction of an alkyl iodide and an alkali sulfide. Such methods of preparation of mercaptans and alkyl sulfides are not generally commercially feasible and are usually expensive or involve expensive equipment.

Accordingly, it is an object of this invention to provide an economical process for the manufacture of hydroxyalkyl mercaptans and hydroxyalkyl sulfides.

Another object of this invention resides in the provision of an improved catalytic method for the interaction of hydrogen sulfide and epoxides to produce mercaptans and alkyl sulfides. Still other objects and features of the invention will become further apparent from the following detailed description thereof.

In accordance with the aforesaid objects, methods have been devised for the preparation of 2-hydroxyethyl mercaptans and 2,2'-dihydroxyalkyl sulfides which comprise reacting alkylene oxides containing at least three carbon atoms and hydrogen sulfide in the presence of 2,2'-thiodiethanol as a catalyst.

The reaction scheme whereby the 2-hydroxyethyl mercaptans and 2,2'-dihydroxyalkyl sulfides are produced in accordance with the principles of the invention can be conveniently illustrated as follows:

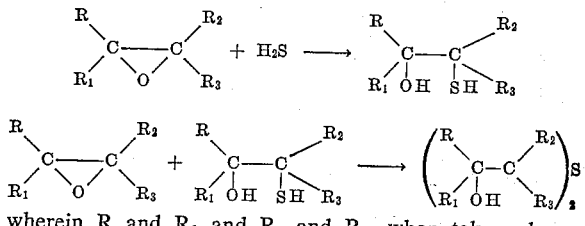

wherein R and $R_1$ and $R_2$ and $R_3$, when taken alone, represent hydrogen, aliphatic cycloaliphatic and aromatic radicals and R and $R_1$, $R_2$ and $R_3$ or R and $R_2$ or $R_1$ and $R_3$, when taken together, represent cycloaliphatic and aromatic radicals with the proviso that at least one of R, $R_1$, $R_2$, or $R_3$ is a substituent other than hydrogen. More particularly, the substituents R, $R_1$, and $R_2$, when taken alone, represent members of the group consisting of hydrogen, alkyl, haloalkyl, nitroalkyl, cyanoalkyl carbalkoxyalkyl, aryl, haloaryl, nitroaryl, cyanoaryl and carbalkoxyaryl; $R_3$ represents members of the group consisting of R and epoxyethyl, epoxyethylalkyl when R and $R_1$ are hydrogen and $R_1$ and $R_2$, $R_2$ and $R_3$ when taken together, represent carbocyclic ring.

The epoxides which find immediate and practical utility in methods of the invention include epoxides containing at least three carbon atoms such as propylene oxide, butylene oxide, epichlorohydrin, epibromohydrin, styrene oxide, butadiene monoxide, butadiene dioxide, allyl glycidyl ether, phenyl glycidyl ether, butyl glycidyl ether, glycidyl methacrylate, glycidol, alphapinene epoxide, dipentene oxide, 1,4-dichloro-2,3-epoxybutane, vinyl cyclohexene monoxide, vinyl cyclohexene dioxide, 1,2-diisobutylene oxide, limonene diepoxide, resorcinol diglycidyl ether, isosorbide epoxy resin, diepoxy stearic acid, dicyclopentadiene dioxide, 1,2-epoxydecane, methyl 9,10-epoxystearate, bis-epoxydicyclopentyl ether of ethylene glycol, diglycidyl ether of 1,4-butanediol, 1,1,3-tris-(2,3-epoxypropoxy)-butane, bis-(2,3-epoxycyclopentyl) ether, 1,2-bis-(2,3-epoxy-2-methylpropoxy) ethane, diglycidyl ether, 2-vinylthioethylglycidyl ether. The epoxides which can be employed with facility are not necessarily limited to monomeric type compounds and include epoxy resins of the Bisphenol A type as illustrated in U.S. 2,723,924 and U.S. 2,886,473.

Yet other epoxides which are cycloaliphatic in nature can also be employed, such as those set forth in U.S. 2,716,123; U.S. 2,745,847; U.S. 2,750,395; U.S. 2,753,323; U.S. 2,779,771; U.S. 2,786,067 and U.S. 2,985,667. It is to be noted that the epoxides useful herein are characterized by the presence in the molecule of the oxygen atom attached to vicinal carbon atoms.

The catalyst, 2,2'-thiodiethanol, is employed in catalytic amounts of from about 1.0 weight percent to about 15.0 weight percent based on the amount of epoxide charged to the reaction.

The relative amounts of reactants which are to be employed will be dictated by the type of product which is desired. When it is desired to produce mercaptans as the predominant product of the reactants stoichiometric amounts of epoxide and hydrogen sulfide can be employed. To insure production of mercaptans it is preferred to carry out the reaction using a molar excess of hydrogen sulfide. In this regard, a 10 percent molar excess is sufficient to insure the desired results. In preparing the sulfide at least two moles of epoxide should be employed for each mole of hydrogen sulfide. If desired, an excess of epoxide of the order of 10 molar percent can be employed.

In carrying out the method of the invention an epoxide, such as propylene oxide, is introduced into a pressure resistant vessel, such as a shaker bomb, along with 2,2'-thiodiethanol. An exothermic reaction takes place between the epoxide and the 2,2'-thiodiethanol, therefore external cooling means should be provided to maintain the temperature at about 65° C. to 70° C. Hydrogen sulfide is then introduced by bubbling through the reaction mixture. Hydrogen sulfide is introduced until the absorption thereof ceases. If desired, hydrogen sulfide can be introduced under pressure and the reaction conducted under a superatmospheric pressure. After the reaction is complete the temperature is lowered to room temperature and the product recovered by any conventional means such as vacuum, or fractional distillation from the reaction mixture.

As indicated above the reaction can be conducted at superatmospheric pressure, although subatmospheric or atmospheric pressure can be employed. When superatmospheric pressure is employed a pressure in the range of from 50 to 200 pounds per square inch gage will suffice.

The temperature at which the reaction is carried out is not necessarily a critical feature of the invention and any convenient temperature in the range of from 50° C. to 250° C. and preferably from 50° C. to 150° C. can be employed.

The following examples will serve to illustrate the practice of the invention.

Example 1

Three hundred, (300), parts of epichlorohydrin were mixed with 30 parts, 2,2'-thiodiethanol and hydrogen sulfide was bubbled into the solution. The temperature gradually increased to 65° C.–70° C. from the heat of reaction. The temperature was maintained at 65° C.–70° C. by cooling with a water bath. The addition of hydrogen sulfide was continued for five hours or until the absorption of hydrogen sulfide ceased. Nitrogen gas was introduced to remove unreacted hydrogen sulfide from the desired product, 3,3'-dichloro-2,2'-dihydroxypropyl sulfide of the formula

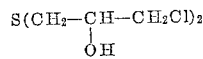

The product cross-linked cellulose when applied essentially by the method of British Patent 696,282 and/or U.S. 2,985,501.

Example 2

One hundred sixteen, (116), grams of propylene oxide and 12.2 grams 2,2'-thiodiethanol were placed in a shaker bomb and the solution was heated to 80° C. The pressure reached 15 p.s.i.g. Hydrogen sulfide was introduced until a pressure of 150–160 p.s.i.g. was obtained; the temperature was maintained at 80° C. Thirty-four (34) grams hydrogen sulfide were added at 80° C. with shaking during a 5 hour period. The temperature was maintained at 80° C. for an additional 5 hours and then lowered to room temperature. 15.7 grams product was obtained. The product was purified by vacuum distillation. The 1,1'-dimethyl-2,2'-dihydroxyethyl sulfide distilled at 111–113° C./3 mm. Hg.

Example 3

The procedure of Example 1 was followed except that 300 parts of styrene epoxide were used in place of epichlorohydrin and the hydrogen sulfide was introduced at 150° C. and there was produced 1,1-diphenyl-2,2'-dihydroxyethyl sulfide of the formula:

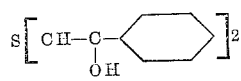

While the invention has been described in various of its specific embodiments as illustrated in the specific illustrations thereof set forth above it is obvious that numerous variations and modifications of the invention can be made without departing from the spirit and scope thereof. Therefore it is not intended that the invention be limited except as necessitated by the appended claims.

What is claimed is:

1. The method of producing mercaptans and sulfides corresponding thereto which comprises reacting an epoxide containing at least three carbon atoms and hydrogen sulfide in the presence of from about 1.0 weight percent to about 15.0 weight percent based upon the amount of epoxide of 2'2-thiodiethanol.
2. The method of claim 1 wherein the reaction is carried out at a temperature of from 50° C. to 250° C.
3. The method of claim 1 wherein the reaction is carried out under superatmospheric pressure.
4. The method of claim 1 wherein the epoxide is propylene oxide.
5. The method of claim 1 wherein the epoxide is epichlorohydrin.
6. The method of claim 1 wherein the epoxide is styrene oxide.
7. The method of claim 1 wherein the epoxide is vinylcyclohexene monoxide.
8. The method of claim 1 wherein the epoxide is vinylcyclohexene dioxide.
9. The method of claim 1 wherein the epoxide is dicyclopentadiene dioxide.
10. The method of claim 1 wherein the epoxide is 1,2-epoxydecane.
11. The method of claim 1 wherein the epoxide is bis-(2,3-epoxycyclopentyl) ether.
12. The method of claim 1 wherein the epoxide is allyl glycidyl ether.
13. The method of claim 1 wherein the epoxide is butadiene monoxide.

References Cited

FOREIGN PATENTS 796,216    8/1966    France.

CHARLES B. PARKER, *Primary Examiner.*

JOSEPH P. BRUST, *Examiner.*

D. R. PHILLIPS, *Assistant Examiner.*